J. B. KIRBY.

VACUUM PRODUCING MACHINE.

APPLICATION FILED JAN. 10, 1916.

Reissued Apr. 4, 1916.

14,100.

2 SHEETS—SHEET 1.

Inventor

James B. Kirby

By Hill Smith Brock & West his Attys.

J. B. KIRBY.

VACUUM PRODUCING MACHINE.

APPLICATION FILED JAN. 10, 1916.

Reissued Apr. 4, 1916. 14,100.

2 SHEETS—SHEET 2.

Inventor

James B. Kirby

By Hull, Smith, Brock, & West his Attys.

UNITED STATES PATENT OFFICE.

JAMES B. KIRBY, OF CLEVELAND, OHIO.

VACUUM-PRODUCING MACHINE.

14,100. Specification of Reissued Letters Patent. Reissued Apr. 4, 1916.

Original No. 1,010,388, dated November 28, 1911, Serial No. 549,517. Application for reissue filed January 10, 1916. Serial No. 71,370.

*To all whom it may concern:*

Be it known that I, JAMES B. KIRBY, a citizen of the United States, residing at Cleveland, in the county of Cuyahoga and State of Ohio, have invented a certain new and useful Improvement in Vacuum-Producing Machines, of which the following is a full, clear, and exact description, reference being had to the accompanying drawings.

My invention relates to vacuum producing machines for floors, walls and the like, and the invention consists in a machine constructed and adapted to operate substantially as shown and described and particularly pointed out in the claims.

Figure 1:
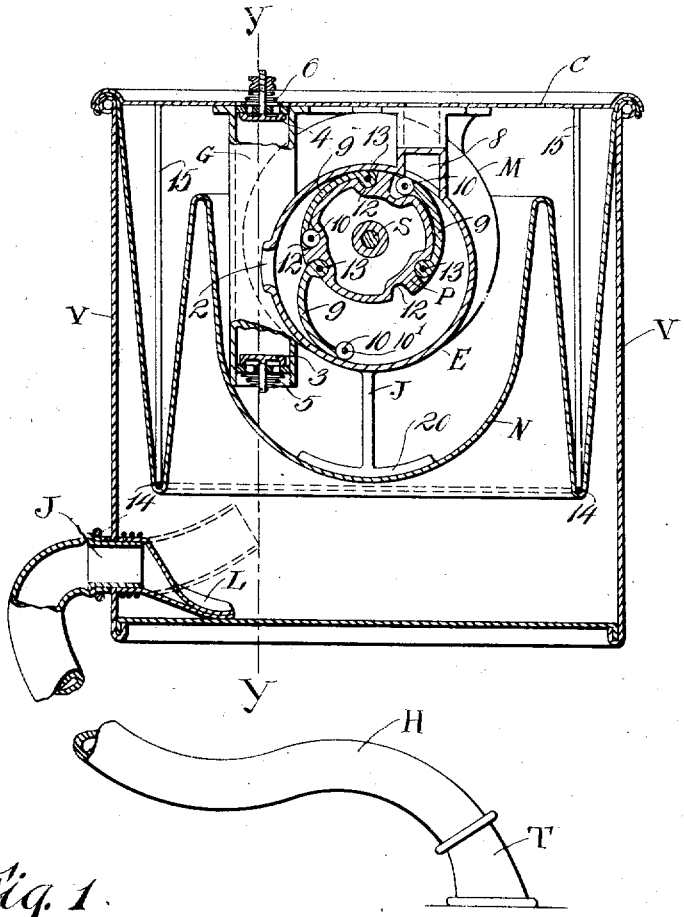
Figure 2:
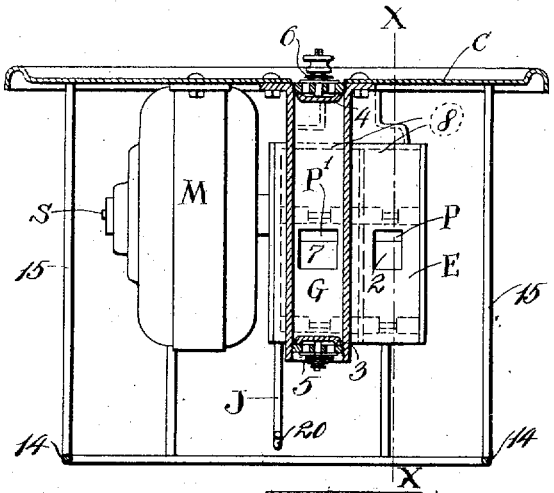
Figure 4:
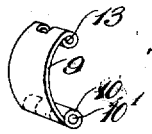
Figure 5:
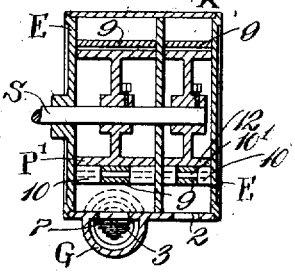

In the accompanying drawings, Figure 1 is a vertical sectional elevation of the machine taken through the smaller of the two rotatable members shown and corresponding substantially to line X—X, Fig. 2, and Fig. 2 is a sectional elevation at right angles to Fig. 1 and substantially on line *y—y* thereon. Fig. 3 is a cross section on the axis of the two rotors, and Fig. 4 is a detail of the rotor or piston wings.

It is known by all those skilled in the art of vacuum cleaning that there is needed a large volume of air and a strong vacuum to do perfect work, and not being able to obtain both with a minimum amount of power, for such must be the case on all portable machines, they have divided into two classes, vacuum cleaners and suction sweepers, the former using a pump which, if it has too much capacity or enough to do the proper work would overload a motor, and the latter using a fan which throws plenty of air when the hose are open but fails to work when pressure is required.

The invention comprises an outer containing vessel V within which all the operating parts are housed, and a separate cover C adapted to carry the electric motor M. The two rotors and motor are operatively connected in any suitable way, a through shaft S for said parts being shown in this instance. The said rotors, so-called, are shown and described herein as pumps, but when considered in the light of their function, which is to exhaust air from the machine, they might be regarded as suction devices, blowers or the like. However, for convenience of description said parts are referred to as pumps and are mounted together on shaft S in a suitable casing E. A division wall separates the said casing into two chambers and one pump is preferably wider than the other. An inlet opening 2 for air is provided for the smaller pump from within the outer vessel or wall V, while the larger pump is put into communication with the inside of vessel V through a walled air passage or tube G having a valve 3 at its bottom and a valve 4 at its top. Both valves 3 and 4 are provided with springs 5 and 6 respectively and open inward as to their seats. The tension of said springs may vary according to the conditions under which the valves are desired to operate, but spring 5 is weaker than 6, and when one valve is open the other naturally is closed. Just why this is so and the working relation of the valves to the pumps will presently appear.

The rotor P′ has an air inlet 7 in its casing from tube or passage G, and both pumps have corresponding exhaust openings 8 which discharge through cover C at the top. The said casing E is circular and considerably larger in cross section than the pumps, and the pumps are placed in such position eccentrically to the axis of the casing that they are relatively near to the exit or exhaust opening 8 and correspondingly removed from the air inlets 2 and 7 respectively. This provides a large area within the pump chamber open to the air inlet and in which the blades or wings 9 operate to exhaust the air. The said wings or blades are separate members segmentally curved to conform to the curvature of the pumps and pivoted in transverse recesses in the periphery of the pumps and provided with rollers 10 at their free edges adapted to roll or run in engagement with the surface of the pump casing when at work, as seen in Fig. 1. The surface of the pumps has transverse recesses 12 corresponding to said rollers and of a depth permitting the blades or wings to fold down closely upon said surface when closed but otherwise adapted to swing outwardly upon their pivots 13 under the centrifugal action of the pump and run upon the surface of the casing at their outer edges with hardened steel anti-friction rollers and pins 10′ at their immediate supports.

H represents a flexible tube or hose having a suitable vacuum or cleaner tool T attached to its end and adapted to operate as such tools usually do in cleaning floors, carpets, walls, upholstered furniture and the like. A coupling tube J through the air inlet in the bottom and side of the outer vessel V connects the hose with said vessel and a flexible and collapsible sleeve L is fixed upon the inner end of said coupling or tube J and delivers the air into the vessel. The said sleeve may be made of any suitable material, but a grade of heavy duck or canvas which is closely woven and practically air tight is preferred. Such material has the advantage of responding freely to suction in which case it will open its full width and be drawn into position more or less as seen in dotted lines Fig. 1, while if pull or suction be suspended the said sleeve will naturally fall and collapse and close the hose against escape of dust from within. In this way the said sleeve operates in effect as a valve adapted to open and close according to working conditions as described.

The location of the tube above the bottom of the vessel affords space for the accumulation of a considerable quantity of refuse without clogging the inlet. The horizontal location of the tube causes the axis of the collapsed sleeve to assume the same general position as the axis of that sleeve when distended, thus rendering it peculiarly sensitive to differences in pressure and permitting an entrance of dust laden air in quantities too small to distend the sleeve fully.

The dust laden air having been delivered into vessel or receptacle V, it is intercepted and cleansed or screened by the fabric or other mesh N interposed between said inlet and said pumps. Said mesh or bag has such ample proportions or area that the edge thereof can be fastened beneath the edge of cover C while practically a triple screening surface is afforded lower down and relatively as shown. To this end the said screen or bag is preferably made out of a suitable piece of closely woven and fairly heavy fabric and in substantially bag shape and suspended from about the top of the vessel outside of a wire or like ring 14 which is hung from cover C by wire or like hangers 15 at intervals and serves to spread and distend the screen as shown. Then as the air is exhausted by the pumps the surplus of the bag is drawn upward inside against ring 14 and assumes more or less exactly the position and appearance seen in Fig. 1, the idea being to give the bag its full surface exposure in the vessel and thereby get the greatest possible screening or cleansing area therefrom.

Now, having all the parts constructed, related and adapted to operate as thus set forth the purpose and advantage of having two suction members instead of one alone may be explained. As already seen, the member or rotor P′ is approximately double the size of rotor P in air displacement or capacity, and while it works with the smaller pump under normal conditions it yet is in a very real sense an auxiliary and balancing member rather than the main reliance to do the work. This is so on account of the wide differences in the character of work to be done. Thus, suppose that at one time the tool T is passing over a very uneven surface and during which an unusually large volume of air is unavoidably drawn in, and that at another time it runs closely over an even surface, like a rug or carpet, and comparatively little air is drawn in. The varying conditions of air inside the machine will correspond exactly to the widely different conditions of air intake at the tool, with the effect of flooding the machine with air in the first instance and nearly cutting off the supply in the other instance, thus inducing more or less vacuum or tendency to vacuum in the vessel with proportionately increased back pull on the pumps.

Now, I have planned this machine to run at a substantially uniform rate of speed at all times and with a substantially uniform load or pull under all conditions regardless of the surfaces of objects cleaned or of the volume of air drawn through the hose H at different times. Obviously, rotor P must work all the time upon the air in the machine because it is directly and constantly open thereto through inlet 2, but in the case of the rotor P′ there is interposed the valved air passage or chamber G, and air is not admitted to this chamber or passage except through the mechanically seated valves 3 and 4, which necessarily offer some resistance to the passage of air. Of course it must follow that normally the lower valve 3 will respond to suction from rotor P as soon as the pump begins to operate as otherwise there would be vacuum in chamber G unless relieved through valve 4 above, but this is an emergency valve and is not intended to open until conditions become abnormal.

Now, since both pumps normally work together in exhausting the air from the vessel and presumably with a full supply of air therein, let us assume that the machine is changed to clean an even surfaced carpet or the like so that a greatly reduced or rotatively small amount of air is drawn in, say no more than rotor P alone can take care of. But rotor P′ also is at work, and it follows that such vacuum conditions will soon be created and a back pull on the pumps produced if this condition continues that the machine will be brought to a standstill—if there be no collapse of the wall of vessel V in addition. Obviously this would be fatal to practical operations, and I have planned the machine to take care of this condition automatically with such sensitiveness or responsiveness that the change is made from actual work through valve 3 to relief work through valve 4, or reversely, and so that no material difference occurs in the speed of the machine or in the load upon the motor. Now, reverting to the tendency just above described to vacuum in the machine under certain conditions, the said condition is met by valve 4 which yields to the extra pull of rotor P′ and affords the needed relief. This also relieves the pull on valve 3, which is now free to seat under the action of its own spring and the pull indirectly from rotor P. Both pumps will now continue to work but only one upon air in the vessel while the other works in a mere balancing relation on outside air through valve 4. This will continue until the volume of air entering the vessel by channel H increases so as to relieve the tension in the vessel and switches rotor P′ from idle to active work with rotor P. Valve 4 closes as this occurs and original operating conditions are restored. The rotor P′ and its separate double valved air passage G thus automatically become balancing and relief members for the machine in addition to performing the primary function of exhaust work with rotor P. In this way excessive back pull on the pumps by vacuum is rendered impossible and the operations of the motor are substantially equalized.

It will be noticed that the wings 9 come into action and traverse the inlet opening 2 of the pump when the entire inner area of the pump is full of air, and that the air is then forced out the exhaust 8 and the wing closed as it passes the same as seen at the top Fig. 1. This however leaves the said exhaust open for the air in advance of the wing that follows. Practically therefore both inlet and exhaust are constantly open but the position of the pump in relation to exhaust 8 is such that no air can pass around with the pump. This is true of both pumps as both are constructed and work alike in these particulars and might be of the same size and serve my purpose.

As already stated, I am using the word pump to describe the two rotors or rotatable suction members but do not wish thereby to be understood as limiting myself to this or any particular form of pump or device for doing this work. Rather it should be understood that the invention is broad enough to comprise any rotatable suction or exhaust medium which will perform the office of the pumps shown and may be substituted therefor. Hence the use of the term pump or pumps in the claims should be regarded as comprehending devices of this kind whatever their exact form.

A spreader J for the bag or screen is suspended from the bottom of the pump casing E and has a relatively wide spreading surface 20 which, in operation, engages the exact center of the bottom of the bag as the same is drawn up by suction, and thus the bag naturally assumes about the shape shown in Fig. 1 when it is fully stretched by exhaust of air from within. The said bag N is stiff enough to hold about this position even when exhaust is suspended.

Having thus described my invention, what I claim is:

1. In vacuum machines, a set of rotatable exhaust members having separate air channels open thereto from within the machine, and means in one of said channels adapted to open the channel to air inside the machine or outside thereof according to the state of the air in the machine.

2. A vacuum machine comprising a set of pumps and a valved air passage to one of said pumps provided with a valved opening into the machine and a valved opening to the outer air.

3. In vacuum machines, a pair of exhaust pumps and one of said pumps having an air inlet permanently open to the inside of the machine and an air passage open to the other pump having valved openings respectively to the inside and the outside of the machine, said valves being under different degrees of mechanical pressure and hence opening and closing under different conditions.

4. A vacuum machine comprising two rotary pumps of different capacities and the smaller pump having a constant opening into the machine and an air passage to the larger pump adapted to be opened to either the outside or the inside of the machine, and spring pressed valves controlling the openings in said passage.

5. A vacuum machine comprising a vessel and a removable cover therefor, a pump casing supported from said cover and a pair of rotary pumps working in different chambers in said casing, and a separate air passage for one of said pumps having a valved air inlet through said cover and another to the inside of the machine.

6. A vacuum machine comprising a vessel with a separate cover, a pair of rotary pumps suspended from said cover and having exhaust openings through the cover and one of said pumps adapted to take air from within or without the vessel.

7. A vacuum machine having a vessel with a separate cover, a pair of pumps suspended from said cover and an air passage to one of said pumps provided with a valve in its lower portion open to the inside of the said vessel and a valve in its upper portion open through said cover and springs for said valves of varying pressure.

8. A vacuum machine having a vessel with a substantially horizontal inlet for dust laden air, and a collapsible sleeve of limp cloth communicating with said inlet inside said vessel, said inlet being located so near the bottom of the vessel as to cause said sleeve to extend in approximate alinement with said inlet both in collapsed and distended conditions.

9. In vacuum machines, a set of exhaust members having separate air channels open thereto from within the machine and valves so arranged as to relieve or cut out only one of said members in accordance to the state of the air in the machine.

10. In vacuum machines, air exhausting members constructed and arranged to take care of a large volume of air and strong vacuum pressure, and means to relieve one of said members when over-loading of the power that drives the machine occurs and not the other.

11. In a vacuum cleaning machine, a dust receiving vessel having a tubular inlet and a porous wall, means for causing dust laden air to enter through said inlet, and a limp cloth sleeve communicating with said inlet and projecting inside the vessel, said inlet being substantially horizontal and spaced from the bottom end of said vessel a distance less than the length of said sleeve, whereby said sleeve may be supported while collapsed in approximately the same position that it occupies while distended.

In testimony whereof I hereunto have affixed my signature.

JAMES B. KIRBY.